United States Patent [19]

Donovan et al.

[11] Patent Number: 4,708,877
[45] Date of Patent: Nov. 24, 1987

[54] ANIMAL FEED BLOCKS CONTAINING DIETARY SUPPLEMENTS

[75] Inventors: Dennis Donovan, Decatur, Ill.; Michael L. McDonnell, Lincoln; Gerald C. Weigel, Fremont, both of Nebr.; John E. Long, Cedar Rapids, Iowa

[73] Assignee: Archer Daniels Midland Company, Decatur, Ill.

[21] Appl. No.: 854,071

[22] Filed: Apr. 17, 1986

Related U.S. Application Data

[63] Continuation of Ser. No. 626,489, Jul. 5, 1984, abandoned, which is a continuation-in-part of Ser. No. 543,347, Oct. 19, 1983, abandoned.

[51] Int. Cl.$^4$ ............................................... A23K 1/22
[52] U.S. Cl. .................................... 426/69; 426/72; 426/74; 426/623; 426/630; 426/658; 426/807
[58] Field of Search ............... 426/69, 72, 74, 623, 426/630, 635, 658, 807

[56] References Cited

U.S. PATENT DOCUMENTS

| | | | |
|---|---|---|---|
| 3,246,336 | 4/1966 | Baribo et al. | 426/807 |
| 4,016,296 | 4/1977 | De Santis | 426/807 |
| 4,027,043 | 5/1977 | Schroeder | 426/74 |
| 4,171,385 | 10/1979 | Skoch et al. | 426/69 |
| 4,221,818 | 9/1980 | Schroeder | 426/635 |
| 4,265,916 | 5/1981 | Skoch et al. | 426/635 |
| 4,349,578 | 9/1982 | Wright et al. | 426/807 |
| 4,560,561 | 12/1985 | Henderson | 426/807 |

OTHER PUBLICATIONS

Whistler et al., "Starch Chemistry & Technology", Academic Press, 1967, pp. 30-33.

Primary Examiner—R. B. Penland
Attorney, Agent, or Firm—Laff, Whitesel, Conte & Saret

[57] ABSTRACT

Cattle feed blocks are made by a relatively low cost process based, in some embodiments, on the by-product residues of the corn industry. That is, a hardening agent taken from the class consisting of corn gluten feed or corn steep liquor, or both, may be used to provide for hardening the feed block. The first materials to be placed in a mixer include molasses and hot water. The mixer is started, and then the clay is added to keep the ingredients in suspension. Next, animal fat, vitamins, and other ingredients are added to the mixer, after which the mixture is brought to a temperature in the range of about 140° F. to 175° F. at which time magnesium oxide, and vegetable matter are added with the mixer running. Then, all of the ingredients are mixed until the mixture reaches a temperature in the range of 140° F. to 175° F. after which it is placed in corrugated cardboard boxes, to remain in inventory until the resulting feed blocks reach a suitable hardness. It is important to add clay at an early step in the mixing process to disperse the fat.

5 Claims, No Drawings

ANIMAL FEED BLOCKS CONTAINING DIETARY SUPPLEMENTS

This is a continuation of U.S. patent application Ser. No. 06/626,489, filed July 5, 1984, now abandoned, which is a continuation in part of U.S. patent application Ser. No. 06/543,347, filed Oct. 19, 1983, now abandoned.

This invention relates to animal feed blocks and, more particularly, to molasses based feed blocks containing dietary supplements along with certain hardening agents. The invention is also directed to feed blocks containing plant protein by-products and especially residues of corn which remain after corn processing.

Some of the ingredients used in the inventive feed block has been described in the following U.S. patents on various animal feed blocks: U.S. Pat. Nos. 3,420,672; 4,005,192; 4,016,296; 4,027,043; 4,062,988; 4,160,041; 4,061,728; 4,717,379; 4,171,385; 4,171,386; 4,221,818; 4,234,608; 4,265,916.

There are a number of feed blocks which provide solid weather resistant blocks that animals may ingest, in order to acquire necessary supplements on a self-demand basis. A first consideration and primary purpose for making such blocks is a selection and inclusion of those vitamins, minerals, and similar food supplements which a particular species of animal might require. These supplements should be presented to the animal in a form which does not spoil or erode when exposed to weather or other environmental conditions.

Once these primary purposes are accomplished, other considerations enter into the making of the feed blocks. For example, it is always desirable to improve the ability of the feed block to better withstand more hostile environmental conditions. The blocks should be adaptable to a greater variety of size and shape control. The medium which controls the rate at which the block erodes responsive to the animal ingesting should generally correspond to the rate at which the animal should acquire the food supplement.

Still another consideration is the cost of materials which go into the feed block. If a feed block can be made from materials which are otherwise useless waste, not only is there a monetary savings, but also the food chain has been extended for all animals since, basically, all are competing for the same limited food resources.

Accordingly, an object of the invention is to provide new and improved animal feed blocks. Here, an object is to provide feed blocks having improved resistance to deterioration under adverse environmental conditions. Yet another object is to provide feed blocks having a controlled release of dietary supplements for animals.

A further object is to provide animal feed blocks making a new use of food by-products. Still another object of the invention is to provide a formulation which is adaptable to the manufacture of feed blocks in almost any size and shape.

These and other objects are accomplished by a relatively low cost process based, in some embodiments, on by-product residues of the corn industry. The first materials to be placed in a mixer include molasses and hot water. The mixer is started, and a suspending agent such as clay is added to keep the above and the later added ingredients in suspension. It is critical that the clay be added before fat and other dry ingredients. Next, animal fat, vitamins, and other ingredients are added to the mixer. As these ingredients are added, the mixture is brought to a temperature in the range of approximately 100° F. to 175° F., and preferably about 120° F. to, at which time magnesium oxide, and vegetable matter are added with the mixer running. After the magnesium oxide is added, a chemical reaction causes the temperature changes which take place. Then, all of the ingredients are mixed and the mixture reaches the reaction temperature approximately 140° F. to 175° F., and preferably about 150° F., after which it is placed in corrugated cardboard boxes, to remain in inventory until the resulting feed blocks reach a suitable hardness.

The supplemental addition of heat energy (steam) is critical in the formation of the feed block. This heat initiates the reaction and must be controlled. Although the block is formed over a wide range of temperatures, for production practicality and saleability, this temperature range is preferably maintained in the 120° F. to 145° F. range. If the temperature is very much below 120° F., the blocks take too long to harden, thereby requiring substantial warehouse space. If the temperature rises very much above 145° F., a severe cracking of the blocks may result, which is not acceptable to consumers. For these reasons, a temperature range of 100° F. to 175° F. is usable; however, the most desirable range is 120° to 145° F. After the magnesium oxide is added, the temperature becomes self-controlling and is caused by a chemical reaction.

In greater detail, an exemplary feed block may include any of several formulations, an exemplary one being:

| Ingredient | % |
| --- | --- |
| Cottonseed Meal | 14.956 |
| Urea 281.5 | 4.103 |
| Salt | 2.995 |
| Calcium Carbonate | 4.978 |
| Magnesium Oxide | 4.500 |
| Ferrous Sulfate | 1.000 |
| Animal Fat | 3.775 |
| Molasses 79.5 | 41.514 |
| Water | 15.000 |
| Ammonium Polyphosphate | 5.522 |
| Water Soluble Trace Minerals | .140 |
| Liquid Vitamins A, D, & E | .018 |
| Attapulgite Clay | 1.500 |

By way of example, this formula yields the following nutrients for cattle:

| Ingredient | % |
| --- | --- |
| Moisture | 27.15 |
| Crude Protein (this includes not more than 15% equivalent protein from non-protein nitrogen) | 23.00 |
| Crude Fat | 4.00 |
| Crude Fiber | 2.06 |
| Calcium | 2.25 |
| Phosphorus | 1.00 |
| Salt | 3.00 |
| Potassium | 1.43 |
| Magnesium | 2.91 |
| Vitamin A added | |

Several forms of plant protein and fiber sources may be used either in conjunction with or as a replacement for cottonseed meal. These sources may include, for example, soybean meal, corn gluten meal, fiber sources such as hulls of peanuts, wheat (bran), rice, oats, milo, or barley, or various other and similar materials.

The animal fat sources may be any suitable animal fat, oil or lard such as fish oil, edible tallow, or lard that can be made pumpable and flowable.

The molasses may be cane molasses, beet molasses, starch molasses, citrus molasses, or hemicellulose extract. Molasses 79.5 is molasses with a 79.5 Brix, which is an approximate percentage by weight of solids in the molasses solution.

Cane molasses is a by-product of the manufacture or refining of sucrose from sugar cane. Beet molasses is a by-product of the manufacture of sucrose from sugar beets. Both of these molasses preferably have a Brix of not less than 79.5.

Starch molasses is a by-product of the manufacture of dextrose from corn or grain sorghums in which the starch is hydrolized by use of enzymes or acid. The starch molasses should not contain less than 73% total solids.

Citrus molasses is the partially dehydrated juices obtained from the manufacture of dried citrus pulp. It preferably has a Brix of approximately 71.0.

Hemicellulose extract is a by-product of the manufacture of pressed wood. It is the concentrated soluble material obtained from the treatment of wood at elevated temperature and pressure without use of acids, alkalis, or salts. It preferably has a total carbohydrate content of not less than 55%.

Historically, molasses has been used in feeds as a source of available carbohydrate (energy source) for many species of animals. Its use has been greatest in ruminant feed where it has been shown to improve rumen microbial activity.

Molasses should not be heated above 110° F. for any length of time, because exceedingly high temperatures can damage it by causing charring or carmelization. When hot water heating is not available, saturated steam at no more than 15 psi may be used to heat the molasses, but it must be agitated rigorously to avoid local overheating.

Urea is utilized by the ruminant animal to form protein. In greater detail, urea is a non-protein nitrogen which is commercially produced today with a 45.04% nitrogen level or 281.5% crude protein equivalent (45.04% × 6.25). The urea is converted to ammonia and other by-products in the rumen. The rumen microbes incorporate the ammonia and related by-products into cellular protein. Since urea contains no carbohydrate sources, these must be provided by other ingredients.

From a livestock management point of view, it may be desirable to, on occasions, control consumption of the feed blocks. This may be necessary because medications must be fed at specific levels to specific species or because certain ingredients would be detrimental to livestock health if over-consumed. Urea is an excellent example of this type of ingredient. As is well known in the prior art, many consumption limiters are used, two of these being salt at relatively high levels and magnesium oxide itself at high levels. In the inventive feed block, no consumption limiter is added, per se. The nature of the inventive block and of the pH that is maintained in the block limits consumption. The pH is alkaline, in the 9-10 range, with 9.65 preferred. As the animal licks the block, its tongue becomes coated or "slicks over" as a result of the alkaline pH level. The livestock apparently find this objectionable and then stop consuming.

According to some embodiments of the invention, the molasses may be replaced, in whole or part, by corn steep liquor (the formal name of corn steep liquor is "fermented corn extract"). Also, the inventive block may include wet corn gluten feed. Corn steep liquor and wet corn gluten feed are a liquid and solid residue respectively of the corn refining industry. In greater detail, corn is cleaned and soaked or steeped in a battery of tanks (steeps) together with warm water containing 0.1 to 0.2 percent sulfur dioxide. The steepwater swells and softens the grain to facilitate separation of the various components and is ultimately drawn off and replaced by fresh water. The steeped corn is germinated in a water slurry by passing it first through a shearing mill which releases the germ and subsequently to a continuous liquid cyclone which separates the germ for oil extraction. The separated endosperm and hull are then ground and screened. The resulting slurry is passed into a continuous centrifuge for starch and gluten separation. The gluten is then added to other by-products such as the steepwater to make wet corn gluten feed.

More information about the corn processing which produces corn steep liquor and wet corn gluten feed by-products is available from the Corn Refiners Association, Inc., at 1001 Connecticut Avenue, N.W., Washington, D.C. 20036, in publications entitled "Tapping the Treasure in Corn", "Nutritive Sweeteners from Corn", "Corn Starch", and perhaps, other publications.

If the wet corn gluten feed is then dried, it is, of course, called "dry corn gluten feed". Either form of corn gluten feed may be used in the inventive process; however, the use of wet corn gluten saves the cost of drying and of rewetting it.

In the inventive block, corn steep liquor or corn gluten feed are processed into a high energy solid form which does not become moldy and which withstands environmental conditions. A "high energy" solid refers to products exemplified by fat, wet corn gluten feed, molasses, and corn steep liquor which are converted to energy. In addition, corn steep liquor and wet corn gluten feed also provide desired nutrients, which need not then be supplied as separate items. To supply additional sources of energy to the feed blocks, the formula may be modified to include whole, rolled or crimped grains.

Since corn steep liquor and wet corn gluten feed are abundant by-products of the wet corn milling industry, shipping costs may be saved by preparing substantially all of the feed block ingredients, except for the corn steep liquor and wet corn gluten feed and then shipping those prepared ingredients to a location having local access to a corn processing plant. There, the corn steep liquor and wet corn gluten feed may be obtained locally and added to the feed block ingredients. Moreover, since corn steep liquor and wet corn gluten feed are often discarded, the corn processing plant management benefits not only by selling that which they would normally have to destroy, but also by saving the cost of destroying it. The public also benefits since a material which could pollute the environment is no longer being dumped.

A process for manufacturing an exemplary cattle feed block begins by feeding the following ingredients into a Bard and Bard mixer (made by Bard and Bard of Joplin, Mo.). This mixer includes a pump, a tank with a mixer, and an injector. The pump and injector run independently of the mixer. The mixer runs responsive to a turbine.

The temperature of the molasses and fat should preferably be in the range of 100° F. to 120° F.

| STEP 1 | Weigh a given amount of hot molasses and feed it into the Bard and Bard tank. | 41.514 |
| --- | --- | --- |
| STEP 2 | Add hot water to the tank, if available, or condensate. | 15.000 |
| STEP 3 | Add ammonium polyphosphate. | 5.522 |

The ingredients of Steps 1-3 may be added into the mixture in any order.

| STEP 4 | Add attapulgite clay. Mix for three minutes. | 1.500 |
| --- | --- | --- |

It is important that the clay be introduced at this step and before proceeding to Steps 5-7 so that the fat and dry ingredients which are added in Steps 5, et seq. remain in suspension.

| STEP 5 | Weigh urea and add it to the mixture while the Bard and Bard turbine mixer continues to run. | 4.103 |
| --- | --- | --- |
| STEP 6 | Weigh and add animal fat. | 3.775 |
| STEP 7 | Add Calcium Carbonate | 4.978 |
|  | Salt | 2.995 |

The sequence of Steps 5-7 should be followed carefully.

| STEP 8 | Add water soluble trace minerals through the injector. | .140 |
| --- | --- | --- |
| STEP 9 | Add liquid vitamins A, D, and E through the injector. | .018 |
| STEP 10 | Add ferrous sulfate through injector. | 1.000 |

Steps 8-10 may occur in any desired sequence.

| STEP 11 | After the above ingredients have been mixed, bring temperature of the mix to 140° F., with mixer operating. |  |
| --- | --- | --- |
| STEP 12 | Weigh and add magnesium oxide. | 4.500 |
| STEP 13 | Weigh and add cottonseed meal. | 14.956 |

It is important for the magnesium oxide to be added in the next to last step.

After the above thirteen steps, various additional and optional steps may be carried out. For example, cottonseed meal may be added and mixed for two minutes or until the temperature of the mix reaches approximately 140° F. to 175° F. and preferably 150° F. Then, the mixture is pumped from the Bard and Bard mixer to a pack tank, from which it is immediately transferred to suitable corrugated cardboard boxes.

The blocking agent ferrous sulfate of Step 10 is a catalyst for starting the hardening process; however, it is not required. Calcium sulfate is another catalyst which is also satisfactory.

In other and preferred embodiments, a blocking or hardening agent taken from the class consisting of corn gluten feed or corn steep liquor, or both, may be used to provide for hardening the feed block. Both corn steep liquor and corn gluten feed cause an exothermic reaction to occur in the ingredients, which hardens the block. This reaction is thought to be not too dissimilar from making mortar or cement. This form of reaction is identified in many chemistry books.

A feed block is not normally considered to be a "solid" until it withstands six pounds per square inch pressure. To measure this, an Effegi Model No. FT 011 fruit pressure tester is used with a 5/16" plunger. This tester is available from McCormick Fruit Treat Co., of Yakima, Wash. In any event, the filled corrugated cardboard boxes remain in inventory until the blocks withstand approximately four to six pounds per square inch pressure. The boxes are preferably not moved for at least four hours, and the final block product preferably is not transported for sale until the block withstands a six pound per square inch pressure.

EXAMPLE I

MOST PREFERRED EMBODIMENT

Preparation of a solid animal feed supplement utilizing corn steep liquor as a blocking agent.

| Ingredients | Preferred % | Preferred Range |
| --- | --- | --- |
| Molasses | 40.0 | 20-60 |
| Water | 13.0 | 0-20 |
| Attapulgite Clay | 1.5 | 1-5 |
| Fat | 3.8 | 0.20 |
| Urea | 4.1 | 0-25 |
| Magnesium Oxide | 4.5 | 4-6 |
| Cottonseed Meal | 14.0 | 0-40 |
| Calcium Carbonate | 5.0 | 1-10 |
| Salt | 3.0 | 1-15 |
| Corn Steep Liquor | 10.0 | 5-30 |
| Macro Minerals, Trace Minerals and Vitamins to correct animal deficiencies | 1.1 | .5-10 |

In this example, the corn steep liquor provides both nutrients and a blocking action which helps to harden the block. The corn steep liquor can be added to any step and is preferably added with the water. The addition of the other ingredients of Example I and the following examples follows the basic sequence of steps listed above.

Macrominerals are minerals which are provided in larger amounts and "trace" minerals are provided in very minute amounts. For example, calcium carbonate and salt are examples of macrominerals, whereas zinc and calcium iodate are trace minerals used in the inventive block. The trace minerals and vitamins are normally measured in milligrams, micrograms or parts per million.

EXAMPLE II

SECOND MOST PREFERRED EMBODIMENT

Preparation of a solid animal feed supplement utilizing corn gluten feed as a significant ingredient.

| Ingredients | Preferred % | Preferred Range |
| --- | --- | --- |
| Molasses | 41.0 | 20-60 |
| Corn Steep Liquor | 2.5 | 2-30 |
| Water | 0 | 0-20 |
| Attapulgite Clay | 1.5 | 1-5 |
| Fat | 3.3 | 0.20 |
| Urea | 5.3 | 0-25 |
| Magnesium Oxide | 4.5 | 4-6 |

| Ingredients | Preferred % | Preferred Range |
|---|---|---|
| Corn Gluten Feed (wet or dry) | 30.0 | 5–50 |
| Corn Gluten Meal | 0 | 1–40 |
| Calcium Carbonate | 3.8 | 1–10 |
| Salt | 3.0 | 1–15 |
| Macro Minerals, Trace Minerals and Vitamins to correct animal deficiencies | 5.1 | .5–10 |

The corn steep liquor and corn gluten feed act as hardening agents and also provide nutrients in this example. If desired, in this example, calcium sulfate may be added. When calcium sulfate is used, it is preferably added to provide 1% of the total mixture.

The process steps for Example II are essentially the same as that described above, with clay again being added to the mixture before fat or dry ingredients are added. Corn steep liquor can be added at any step, and corn gluten feed or corn gluten metal are added as the last step where cottonseed meal would be added.

EXAMPLE III

Preparation of a solid animal feed block supplement using calcium sulfate and corn steep liquor as blocking agents.

| Ingredients | Preferred % | Preferred Range |
|---|---|---|
| Molasses | 40.0 | 20–60 |
| Corn Steep Liquor | 10.0 | 5–30 |
| Water | 13.6 | 0–20 |
| Attapulgite Clay | 1.5 | 1–5 |
| Fat | 3.5 | 0.20 |
| Urea | 5.3 | 0–25 |
| Magnesium Oxide | 4.5 | 4–6 |
| Calcium Sulfate | 1.0 | .5–2 |
| Cottonseed Meal | 11.2 | 0–40 |
| Calcium Carbonate | 2.8 | 1–10 |
| Salt | 2.7 | 1–15 |
| Macro Minerals, Trace Minerals and Vitamins to correct animal deficiencies | 3.9 | .5–10 |

Preferably, all of the foregoing processes are followed by using a single mixer. Again, the clay should be added in the same step in the process, relative to the addition of the other ingredients. That is, the order of the addition of molasses and water is not sufficient as long as they are added before the clay. The clay must be added before the fat, calcium carbonate and other dry ingredients.

EXAMPLE IV

Preparation of a solid animal feed supplement utilizing calcium sulfate as a blocking agent.

| Ingredients | Preferred % | Preferred Range |
|---|---|---|
| Molasses | 40.5 | 20–60 |
| Calcium Sulfate | 1.0 | .5–2 |
| Water | 15.0 | 0–20 |
| Attapulgite Clay | 1.5 | 1–5 |
| Fat | 3.8 | 0–20 |
| Urea | 4.1 | 0–25 |
| Magnesium Oxide | 4.5 | 4–6 |
| Cottonseed Meal | 15.0 | 0–40 |
| Calcium Carbonate | 5.0 | 1–10 |
| Salt | 3.0 | 1–15 |
| Ammonium Polyphosphate | 5.5 | 5–30 |
| Macro Minerals, Trace Minerals and Vitamins to correct animal deficiencies | 1.1 | .5–10 |

In this example, calcium sulfate is a catalyst which is used to initiate the hardening process. As with the other examples, it is important for the clay to be added to the mixture prior to the addition of fat or dry ingredients.

In addition to the ingredients which have been mentioned heretofore, the feed block may also contain soybean meal, cottonseed meal, corn gluten meal, meat scraps, blood meal, feather meal, brewers grains, wet or dried, (i.e. the residue from a beer-making process). These ingredients are added as the final step of the process. Also, corn steep liquor may be replaced by other suitable steep liquors of the grain industry, such as milo or wheat.

Those who are skilled in the art will readily perceive how to modify the invention. Therefore, the appended claims are to be construed to cover all equivalent structures which fall within the true scope and spirit of the invention.

The claimed invention is:

1. A process for forming a solid animal feed block consisting essentially of adding to a single mixer ingredients of said solid block in the following sequence:
  (a) adding to said mixer 20–60% by weight molasses and 0–20% water,
  (b) adding to (a) 1–5% by weight of attapulgite clay to produce a suspension;
  (c) adding to (b) 4–6% by weight of urea;
  (d) adding to (c) 0–20% by weight of animal fat;
  (e) adding to (d) 0–10% by weight calcium carbonate and 1–15% by weight salt;
  (f) adding to (e) 0–2% by weight calcium sulfate; and 0.5% to 10% by weight of vitamin and mineral feed supplements;
  (g) adding as the next to last ingredient 4–6% by weight magnesium oxide;
  (h) adding to (g) in any order 2.5%–30% by weight corn steep liquor; 0–50% by weight corn gluten feed; 0–40% by weight corn gluten meal; and 0–14% by weight cottonseed meal;
  (i) after (h), mixing until the temperature of the mixture reaches a temperature of 140°–175° F., and then transferring the mixture from said mixer into containers to harden.

2. The process of claim 1 wherein in step (c) adding 4.1–5.3% by weight of urea; and in step (d) adding 3.3–3.8% by weight of animal fat.

3. The process of claim 1 wherein the ingredients added to the mixer are in step (a) 41.0% by weight molasses; in step (b) 1.5% by weight attapulgite clay; in step (c) 5.3% by weight urea; in step (d) 3.3% by weight fat; in step (e) 3.8% by weight calcium carbonate, and 3.0% by weight salt; in step (f) 5.1% by weight minerals and vitamins to correct animal deficiencies and wherein the minerals are selected from the group consisting of macro minerals, trace minerals and mixtures thereof; in step (g) 4.5% by weight magnesium oxide; and in step (h) 2.5% by weight corn steep liquor; and 30.0% by weight corn gluten feed.

4. The process of claim 1 wherein the ingredients added to the mixer are in step (a) 40.0% by weight molasses and 13.0% by weight water; in step (b) 1.5% by weight attapulgite clay; in step (c) 4.1% by weight urea; in step (d) 3.8% by weight fat; in step (e) 5.0% by weight calcium carbonate 3.0% by weight salt; in step (f) 1.1% by weight minerals and vitamins to correct animal deficiencies and wherein the minerals are selected from the group consisting of macro minerals, trace minerals and mixtures thereof; in step (g) 4.5% by weight magnesium oxide; and in step (h) 10.0% by weight corn steep liquor, and 14.0 by weight cottonseed meal.

5. The process of claim 1 wherein the ingredients added to the mixer are in step (a) 40.0% by weight molasses, and 13.6% by weight water; in step (b) 1.5% by weight attapulgite clay; in step (c) 5.3% by weight urea; in step (d) 3.5% by weight fat; in step (e) 2.8% by weight calcium carbonate and 2.7% by weight salt; in step (f) 1.0% by weight calcium sulfate, and 3.9% by weight minerals and vitamins to correct animal deficiencies and wherein the minerals are selected from the group consisting of macro minerals, trace minerals and mixtures thereof; in step (g) 4.5% by weight magnesium oxide; in step (h) 10.0% by weight corn steep liquor, and 11.2% by weight cottonseed meal.

* * * * *